US011089524B2

(12) United States Patent
Ahmavaara

(10) Patent No.: US 11,089,524 B2
(45) Date of Patent: Aug. 10, 2021

(54) AUTOMATIC CELL DISCOVERY OF A SOURCE RADIO ACCESS NETWORK (RAN) CELL BY A NEIGHBORING, TARGET RAN BY INITIATING A FAKE HANDOVER OF A USER EQUIPMENT (UE) FROM THE SOURCE RAN CELL TO THE TARGET RAN

(71) Applicant: Corning Optical Communications LLC, Hickory, NC (US)

(72) Inventor: Kalle Ahmavaara, San Diego, CA (US)

(73) Assignee: Corning Optical Communications LLC, Charlotte, NC (US)

( * ) Notice: Subject to any disclaimer, the term of this patent is extended or adjusted under 35 U.S.C. 154(b) by 226 days.

(21) Appl. No.: 16/264,110

(22) Filed: Jan. 31, 2019

(65) Prior Publication Data
US 2020/0252844 A1 Aug. 6, 2020

(51) Int. Cl.
*H04W 36/34* (2009.01)
*H04W 36/00* (2009.01)

(52) U.S. Cl.
CPC . *H04W 36/00835* (2018.08); *H04W 36/0061* (2013.01)

(58) Field of Classification Search
None
See application file for complete search history.

(56) References Cited

U.S. PATENT DOCUMENTS

| | | | | |
|---|---|---|---|---|
| 2010/0267373 A1* | 10/2010 | Engstrom | ............ | H04J 11/0093 455/415 |
| 2012/0178450 A1* | 7/2012 | Kuru | ................... | H04W 36/245 455/436 |
| 2013/0303114 A1* | 11/2013 | Ahmad | ................. | H04M 15/49 455/406 |
| 2014/0287757 A1* | 9/2014 | Borg | ....................... | H04W 8/26 455/436 |
| 2015/0271714 A1* | 9/2015 | Shetigar | ............ | H04W 36/0061 370/255 |
| 2016/0119843 A1* | 4/2016 | Kilgour | ............. | H04W 36/0066 455/436 |
| 2016/0142944 A1* | 5/2016 | Cao | .................... | H04W 36/0022 455/436 |
| 2017/0156093 A1* | 6/2017 | Bhumkar | ............... | H04W 36/08 |
| 2019/0045409 A1* | 2/2019 | Rasanen | ............... | H04W 36/36 |
| 2020/0092718 A1* | 3/2020 | Ohlsson | .................. | H04W 8/02 |
| 2020/0169868 A1* | 5/2020 | Ullah | ..................... | H04W 12/06 |

\* cited by examiner

Primary Examiner — Duc T Duong
(74) Attorney, Agent, or Firm — C. Keith Montgomery

(57) ABSTRACT

Automatic cell discovery of a source radio access network (RAN) cell by a neighboring, target RAN by initiating a fake handover of a user equipment (UE) from a source RAN cell to a target RAN. A source RAN cell initiates a handover request using handover signaling to the target RAN(s). The handover request is a fake handover request without actual intention of handing over UE to the target RAN. The source RAN cell includes information in initiated handover request that can be used by target RAN to discover source RAN cell. The handover request will fail, because the handover request is not for any actual UE moving from the source RAN cell to the target RAN. However, the target RAN becomes aware of the source RAN cell as a result of this process and can add the source RAN cell (e.g., its EARFCN) to a list of its neighboring cells.

9 Claims, 7 Drawing Sheets

AUTOMATIC CELL DISCOVERY OF A SOURCE RADIO ACCESS NETWORK (RAN) CELL BY A NEIGHBORING, TARGET RAN BY INITIATING A FAKE HANDOVER OF A USER EQUIPMENT (UE) FROM THE SOURCE RAN CELL TO THE TARGET RAN

BACKGROUND

The disclosure relates generally to mobile communications systems and related networks, such as Universal Mobile Telecommunications Systems (UMTSs), its offspring Long Term Evolution (LTE) and 5th Generation New Radio (5G-NR) described and being developed by the Third Generation Partnership Project (3GPP), and more particularly to automatic cell discovery of a source radio access network (RAN) cell by a neighbor, target RAN by initiating a fake handover of a user equipment (UE) from the source RAN cell to the target RAN.

Operators of mobile systems, such as UMTS and its offspring including LTE and LTE-Advanced, are increasingly relying on wireless small cell RANs in order to deploy, for example, indoor voice and data services to enterprises and other customers. Such small cell RANs typically utilize multiple-access technologies capable of supporting communications with multiple users using radio frequency (RF) signals and sharing available system resources such as bandwidth and transmit power. Evolved universal terrestrial radio access (E-UTRA) is the radio interface of 3GPP's LTE upgrade path for UMTS mobile networks. In these systems, there are different frequencies where LTE (or E-UTRA) can be used, and in such systems, user mobile communications devices connect to a serving system, which is represented by a cell. In LTE, each cell is produced by a node called eNodeB (eNB).

A general principle in LTE or E-UTRA RAN is that a serving RAN (e.g., an eNB in such system) provides a measurement configuration to the mobile communications devices to "point" the receiver of the user mobile communications device to find other neighboring RANs (e.g., neighboring cells) transmitting at a specified frequency(ies) (e.g., at 1900 MHz, 2522.375 MHz, etc.) according to the measurement configuration that the user mobile communications device should measure. The measurement of communications signals of other RANs by the user mobile communications device at specified frequencies is performed for a variety of purposes, including inter-frequency mobility and inter-frequency measurements. The user mobile communications devices can find these neighboring RANs and perform actions, such as cell reselection in the idle mode and sending of measurement reports (e.g., Measurement Report Messages (MRMs)) in the active mode. These measurement reports can be used by the serving RAN to, for example, trigger handovers or to gather information about neighboring RANs through Automatic Neighbor Relation (ANR) discovery. For example, a serving RAN of a mobile network operation (MNO) may use the MRMs for selecting handover targets for user mobile communications devices, to cause the user mobile communications devices to be serviced by a different RAN for optimizing communications. For idle mode user mobile communications devices, this measurement configuration information may be delivered in a System Information broadcast, which is used by the eNB to indicate, point out, and/or determine systems and frequencies in the pertinent area and in particular to indicate to the user mobile communications devices the appropriate measurement configuration parameters. For active mode user mobile communications devices, this measurement configuration information may be delivered in user mobile communications device-specific radio resource control (RRC) signaling messages, and in particular in RRC messages that indicate to the user mobile communications devices the appropriate measurement configuration parameters. In these measurement configuration parameters, there are specific instructions about what frequencies the user mobile communications device should measure. The information discovered by the user mobile communications devices by performing such measurements may then be reported back to the serving RAN or used for initiating mobility functions.

As part of the inter-frequency measurement process, the frequencies to which a serving system instructs a user mobile communications device to point to are indicated by the specific center frequency, or more particularly the E-UTRA Absolute Radio Frequency Channel Number (EARFCN). The EARFCN is an integer number from 0 to 65,535 that points to a specific carrier frequency of interest. Being that the EARFCN represents a specific center frequency, it is easy for a user mobile communications device to tune its receiver to that frequency and determine if there are any other communications systems transmitting on that frequency in the surrounding area of the user mobile communications device. In many situations a user mobile communications device is not performing measurements on any other frequencies than the specific EARFCNs provided to the user mobile communication device by the serving RAN. An MNO can easily configure its serving RAN with the desired EARFCNs to communicate to a user mobile communications device as part of the inter-frequency measurement process, because MNO will know the exact frequency spectrum (i.e., bands) of other potential neighboring cells as they typically do belong to the same MNO in the mobile communications network of the serving RAN. Such frequency bands are typically licensed to that particular MNO, namely to the same MNO that is operating the serving RAN. The use of specific EARFCNs by each cell in the area is thus known to the MNO. For example, one MNO may have cells operating in three (3) known different EARFCNs. Thus, it is generally possible to precisely point the user mobile communications devices to all the specific EARFCNs in which it may find suitable or other cells able to provide service to the user mobile communications device. If "foreign" operations are detected within the MNO's licensed frequency band, the MNO can determine possible misuse of their licensed spectrum.

However, new mobile RANs exist that use spectrum that is independent of an MNO or is not under full control of the MNO in the same way as the traditional licensed spectrum may be. Examples of such spectrums include unlicensed spectrum, shared spectrum, spectrum licensed from a third party, spectrum associated with citizens broadband radio service (CBRS), and so on. In these cases, spectrum allocation, or channel allocation, may be performed by a technique or procedures that occur independently or semi-independently of the MNO, such as by Spectrum Allocation System (SAS), for example. As an example, a CBRS system has 150 MHz of spectrum, and has 1,500 possible EARFCNs. Thus, for example, if a CBRS system is operated in a stadium or arena by a third party, the CBRS system may be dynamically assigned a channel, or operating spectrum, by a SAS. Due to this independent and dynamic nature of spectrum allocation, it would be very difficult for all surrounding neighboring MNO systems to be constantly aware of all the actual frequencies in which these third party CBRS systems were allocated and currently operate on. However, if the third party has a business agreement with an MNO, the third party CBRS network may be however configured to serve user mobile communications devices associated with a specific MNO or a specific set of MNOs. In so doing, the CBRS system is broadcasting the public land mobile network (PLMN) identifications (IDs) (PLMN IDs) of the associated MNOs to enable the user mobile communications device connection. Even with the business relationship between the MNO and the third party operation CBRS systems, the MNO may be completely unaware of the specific frequencies allocated by the SAS to the CBRS system for communications. Even if the third party was made aware of such frequency allocation, this allocation may change dynamically due to steps taken by the CBRS SASs for frequency optimization or other purposes. For example, if a Navy vessel requires use of the spectrum for radar, frequencies available for a CBRS system will be impacted, and thus spectrum allocations may be dynamically shifted by a CBRS SAS. It is difficult and undesirable to have a requirement that each MNO needs to be up to date with a list of employed, allocated frequencies that the systems around them currently use. Requiring such updating would create undesired operational coupling between the third party communications systems and the MNO RANs.

No admission is made that any reference cited herein constitutes prior art. Applicant expressly reserves the right to challenge the accuracy and pertinency of any cited documents.

SUMMARY

Embodiments of the disclosure relate to automatic cell discovery of a source radio access network (RAN) cell by a neighboring, target RAN by initiating a fake handover of a user equipment (UE) from the source RAN cell to the target RAN. For example, the source RAN cell may be a small cell and the target RAN may include a macro base station cell operated by a mobile network operation (MNO). In this regard, in exemplary aspects disclosed herein, a source RAN cell that has already been configured with or discovered by another neighboring, target RAN(s) initiates a signaling message to initiate a handover request to the target RAN(s). The signaling message is a fake handover request without an actual intention of handing over a UE (e.g., a mobile UE) to the target RAN. For example, the signaling message could include a pseudo UE identity that is not an identity of an actual UE communicating with the source RAN cell. The source RAN cell and target RAN can be configured to process the handover request resulting from the signaling message initiated by the source RAN cell using standard handover processing. The source RAN cell includes information in the initiated handover in the signaling message that can be used by the target RAN to discover the source RAN cell. For example, the handover request may include the EARFCN of the source RAN cell or other information to determine the EARFCN of the source RAN cell. The handover request will fail, because the handover request is not for any actual UE moving from the source RAN cell to the target RAN. However, the target RAN becomes aware of the source RAN cell as a result of this process and can add the source RAN cell (and for example, its EARFCN) to a list of its neighboring cells. In this regard, the source RAN cell does not have to first establish communications with a UE in its cell area that is to be handed over for the target RAN to discover the source RAN cell. The target RAN can then, for example, use the discovered source RAN cell(s) for selecting handover targets for UEs, to cause the UEs to be serviced by a different cell for optimizing communications.

The exemplary aspects disclosed herein provide a dynamic and precise way for neighbor cell discovery. The process can use, for example, existing handover signaling (e.g., 3GPP handover signaling) without requiring any hardware or software updates in the target RAN. The source RAN cell can initiate the handover preparation as soon as it has discovered the target RAN. There is no need to have an actual UE connected to the source RAN cell. The process can be fully automatic and thus an extension of the Self Organizing Network (SON) feature operating at the source RAN cell. For example, the target RAN can be configured to process the handover request from the source RAN cell as an actual handover and proceed with the handover request as normal. The handover request will be acknowledged by the target RAN to the source RAN cell, wherein the source RAN cell can then initiate a handover cancellation to the target RAN to cancel the handover request. However, the target RAN will still become aware of the source RAN cell as a result of this process. Additionally, in other exemplary aspects, the source RAN cell and target RAN can agree upon additional specific use cases for handover signaling and processing so the fake handover request can be recognized by the target RAN as fake without the handover request having to fail. For example, such an agreement may allow the target RAN to be able to recognize an agreed upon indicator or other symbol in the handover request from the source RAN cell such that the target RAN can reject the handover request to the source RAN cell after updating its neighboring RANs with the source RAN cell.

In one exemplary aspect of the disclosure, a method of a source RAN initiating discovery of a source RAN cell by a target RAN is provided. The method comprises sending a first signaling message toward the target RAN for handing over a UE from the source RAN cell to the target RAN comprising a UE indicia identifying a UE not communicating with the source RAN cell and a source RAN cell indicia.

An additional embodiment of the disclosure relates to a source RAN cell in a source RAN. The source RAN cell comprises a transmitter circuit configured to transmit a communications signal to a UE. The source RAN cell also comprises a receiver circuit configured to receive communications signals from the UE. The source RAN cell also comprises a processor circuit communicatively coupled to the transmitter circuit and the receiver circuit. The processor circuit is configured to send a first signaling message toward a target RAN for handing over a UE from the source RAN cell to the target RAN comprising a UE indicia identifying a UE not communicating with the source RAN cell and a source RAN cell indicia.

An additional embodiment of the disclosure relates to a method of a target RAN discovering a source RAN cell. The method comprises receiving a first signaling message for handing over a UE to the target RAN comprising a UE indicia identifying a UE not communicating with the source RAN cell and a source RAN cell indicia. The method also comprises discovering the source RAN cell based on the source RAN cell indicia.

An additional embodiment of the disclosure relates to target RAN cell in a target RAN. The target RAN cell comprises a transmitter circuit configured to transmit a communications signal to a UE. The target RAN cell also comprises a receiver circuit configured to receive communications signals from the UE. The target RAN cell also comprises a processor circuit communicatively coupled to the transmitter circuit and the receiver circuit. The processor circuit is configured to receive a first signaling message for handing over a UE to the target RAN comprising a UE indicia identifying a UE not communicating with a source RAN cell and a source RAN cell indicia. The processor circuit is also configured to discover the source RAN cell based on the source RAN cell indicia.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Figure 1:
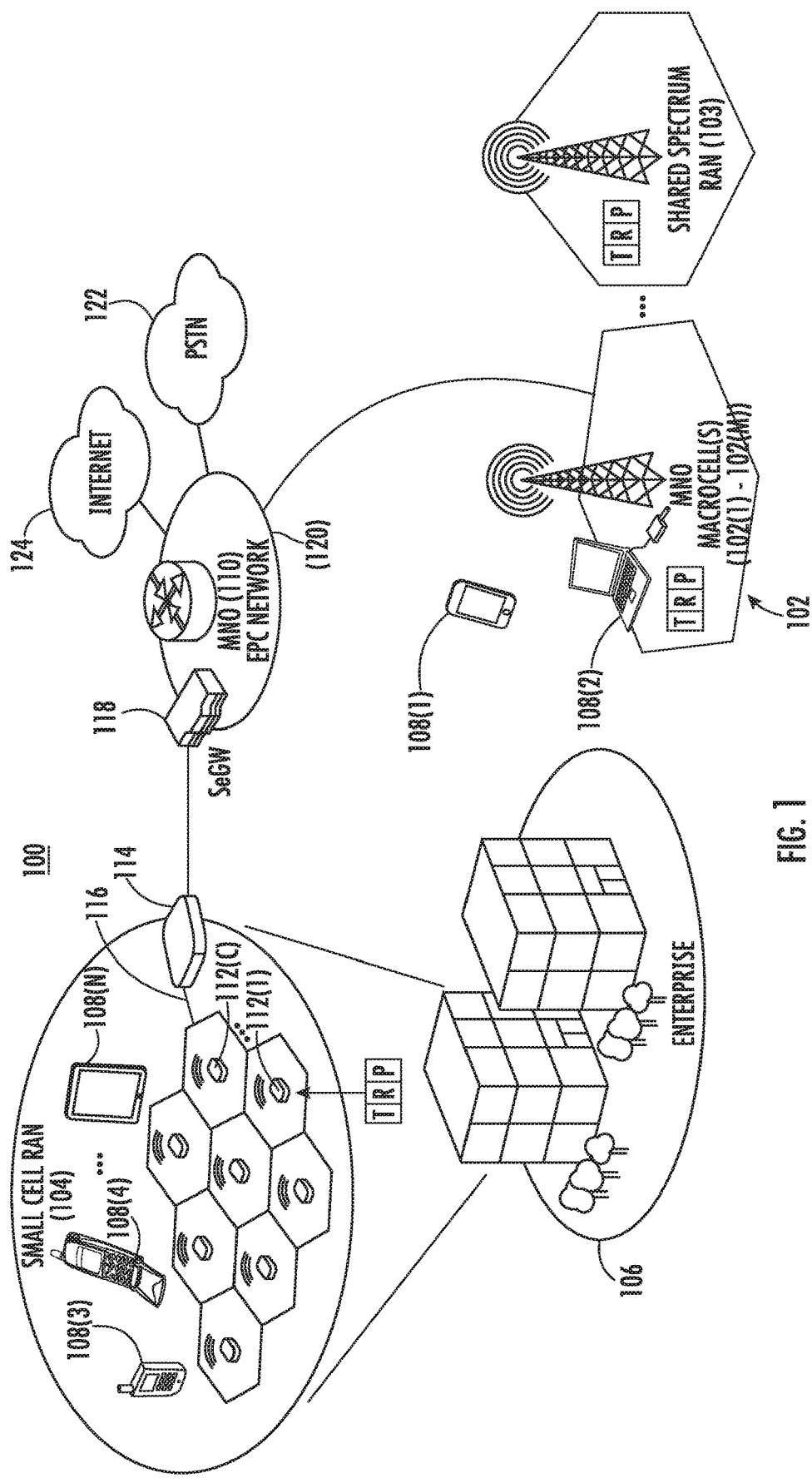
FIG. 1 is a schematic diagram of an exemplary mobile telecommunications environment that includes an exemplary macrocell radio access network (RAN) and an exemplary small cell RAN located within an enterprise environment and configured to service mobile communications between a user mobile communications device to a mobile network operator (MNO), wherein the user mobile communications device is configured to discover neighboring radio access systems to be reported to a serving RAN.

Embodiments of the disclosure relate to automatic cell discovery of a source radio access network (RAN) cell by a neighboring, target RAN by initiating a fake handover of a user equipment (UE) from the source RAN cell to the target RAN. For example, the source RAN cell may be a small cell and the target RAN may include a macro base station cell operated by a mobile network operation (MNO). In this regard, in exemplary aspects disclosed herein, a source RAN cell that has already been configured with or discovered by another neighboring, target RAN(s) initiates a signaling message to initiate a handover request to the target RAN(s). The signaling message is a fake handover request without an actual intention of handing over a UE (e.g., a mobile UE) to the target RAN. For example, the signaling message could include a pseudo UE identity that is not an identity of an actual UE communicating with the source RAN cell. The source RAN cell and target RAN can be configured to process the handover request resulting from the signaling message initiated by the source RAN cell using standard handover processing. The source RAN cell includes information in the initiated handover in the signaling message that can be used by the target RAN to discover the source RAN cell. For example, the handover request may include the EARFCN of the source RAN cell or other information to determine the EARFCN of the source RAN cell. The handover request will fail, because the handover request is not for any actual UE moving from the source RAN cell to the target RAN. However, the target RAN becomes aware of the source RAN cell as a result of this process and can add the source RAN cell (and for example, its EARFCN) to a list of its neighboring cells. In this regard, the source RAN cell does not have to first establish communications with a UE in its cell area that is to be handed over for the target RAN to discover the source RAN cell. The target RAN can then, for example, use the discovered source RAN cell(s) for selecting handover targets for UEs, to cause the UEs to be serviced by a different cell for optimizing communications.

The exemplary aspects disclosed herein provide a dynamic and precise way for neighbor cell discovery. The process can use, for example, existing handover signaling (e.g., 3GPP handover signaling) without requiring any hardware or software updates in the target RAN. The source RAN cell can initiate the handover preparation as soon as it has discovered the target RAN. There is no need to have an actual UE connected to the source RAN cell. The process can be fully automatic and thus an extension of the Self Organizing Network (SON) feature operating at the source RAN cell. For example, the target RAN can be configured to process the handover request from the source RAN cell as an actual handover and proceed with the handover request as normal. The handover request will be acknowledged by the target RAN to the source RAN cell, wherein the source RAN cell can then initiate a handover cancellation to the target RAN to cancel the handover request. However, the target RAN will still become aware of the source RAN cell as a result of this process. Additionally, in other exemplary aspects, the source RAN cell and target RAN can agree upon additional specific use cases for handover signaling and processing so the fake handover request can be recognized by the target RAN as fake without the handover request having to fail. For example, such an agreement may allow the target RAN to be able to recognize an agreed upon indicator or other symbol in the handover request from the source RAN cell such that the target RAN can reject the handover request to the source RAN cell after updating its neighboring RANs with the source RAN cell.

In this regard, FIG. 1 is a schematic diagram of an exemplary mobile telecommunications environment 100 (also referred to as "environment 100") that includes exemplary macrocell radio access networks (RANs) 102(1)-102(M) ("macrocells 102(1)-102(M)"), a shared spectrum RAN 103, and an exemplary small cell RAN 104 located within an enterprise environment 106. The shared spectrum RAN 103 (also referred to as "shared spectrum cell 103") includes a macrocell in this example and supports communications on frequencies that are not solely licensed to a particular MNO and thus may service user equipment (UE) 108(1)-108(N), which are communications devices, independent of a particular MNO. The UEs 108(1)-108(N) may be mobile UEs (e.g., cellular phones or mobile devices) that can communicate wirelessly. For example, the shared spectrum cell 103 may be operated by a third party that is not an MNO and wherein the shared spectrum cell 103 supports citizens broadband radio service (CBRS) or unlicensed spectrum. The mobile telecommunications environment 100 is configured to service mobile communications between a UE 108(1)-108(N) to a mobile network operator (MNO) 110. When a macrocell 102(1)-102(M), shared spectrum RAN 103, or small cell RAN 104 services communications with a UE 108(1)-108(N), such macrocell 102(1)-102(M), shared spectrum RAN 103, or small cell RAN 104 is considered a "source RAN." A source RAN for a UE 108(1)-108(N) is a RAN or cell in the RAN in which the UE 108(1)-108(N) have an established communications session with the exchange of mobile communications signals for mobile communications. Thus, a serving RAN may also be referred to herein as a serving cell. For example, the UEs 108(3)-108(N) in FIG. 1 are being serviced by the small cell RAN 104, whereas UEs 108(1), 108(2) are being serviced by the macrocells 102(1)-102(M). The macrocells 102(1)-102(M) are MNO macrocells in this example. In this example, each of the macrocells 102(1)-102(M), shared spectrum RAN 103, and small cell RAN 104 include a transmitter circuit T configured to transmit a communications signal to a UE 108(1)-108(N), and a receiver circuit R configured to receive communications signals from the UE 108(1)-108(N). Each of the macrocells 102(1)-102(M), shared spectrum RAN 103, and small cell RAN 104 also include a processor circuit P (e.g., a microprocessor, micro-controller, other control circuit) communicatively coupled to the transmitter circuit T and the receiver circuit R for processing communications signals and performing other processing for signaling.

Figure 2A:
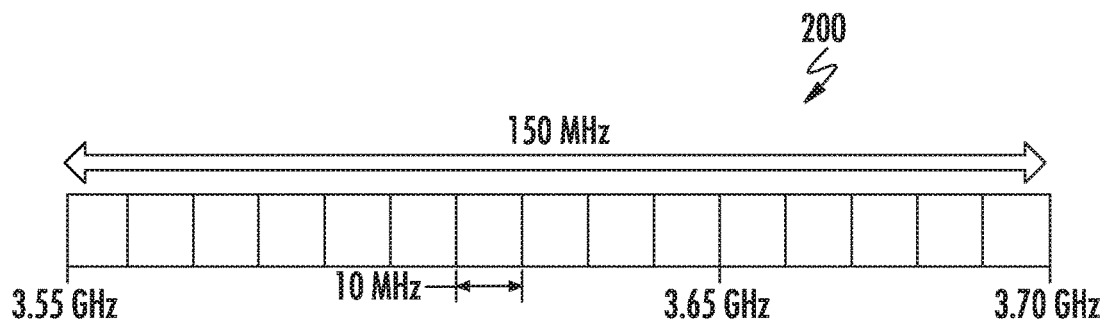
FIGS. 2A-2C illustrate existing and proposed spectrum allocation schemes within the citizens broadband radio service (CBRS)
Figure 2B:
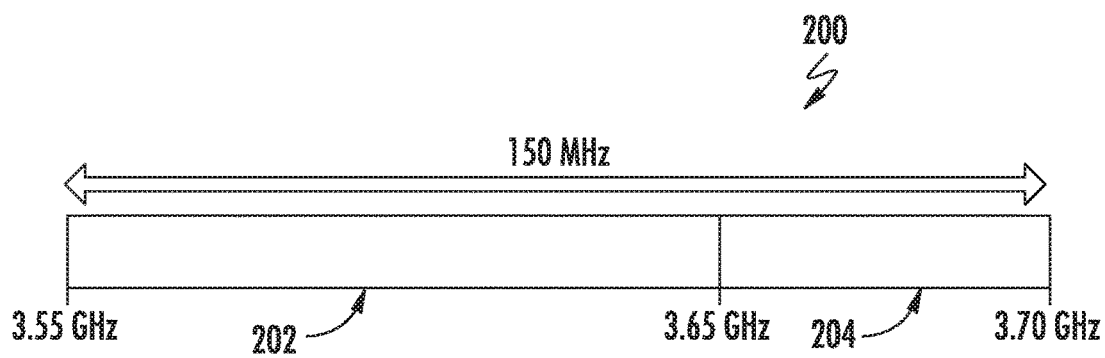
Figure 2C:
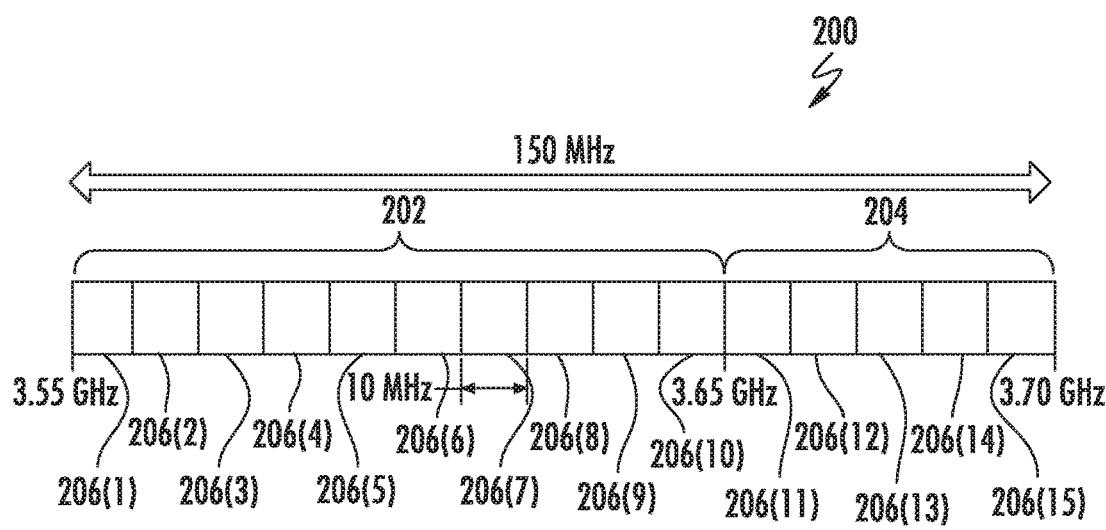

FIG. 2A illustrates a 150 MegaHertz (150 MHz) frequency band 200 between 3.55 GHz and 3.70 GHz to which the Federal Communications Commission (FCC) is opening access as the CBRS. As shown in FIG. 2B, the overall 150 MHz CBRS frequency band 200 is currently divided into a lower 100 MHz section 202 and an upper 50 MHz section 204, with the lower 100 MHz section 202 being used by Navy radars in coastal areas and space-to-earth fixed-satellite service (FSS) stations. The upper 50 MHz section 204 is currently used by WiMax fixed wireless baseband services, three ground radar stations, eighty-six grandfathered space-to-earth FSS stations, and Navy radar for ships located further than 44 miles from the coast. However, as illustrated in FIG. 2C, the FCC is opening up fifteen (15) 10-MHz unpaired channels 206(1)-206(15) for radio services through citizens broadband radio service devices (CBSDs), which are devices configured to operate within the CBRS frequencies and according to CBRS rules. The CBSDs, or parts thereof, may be incorporated in radio nodes within RANs along with other devices and networks. In this regard as illustrated in FIG. 2C, in the new CBRS framework, the 150 MHz CBRS frequency band 200 will be divided into fifteen 10-MHz channels 206(1)-206(15). Other divisions are also possible, and a division to fifteen 10-MHz channels 206(1)-206(15) is illustrated as an example of one possible division. Channels 206(1)-206(10) in the lower 100 MHz section 202 will operate according to a three-tier model, and channels 206(11)-206(15) in the upper 50 MHz section 204 will operate according to a two-tier model.

With reference back to FIG. 1, the mobile telecommunications environment 100 in this example, is arranged as a Long Term Evolution (LTE) system as described by the Third Generation Partnership Project (3GPP) as an evolution of the standards Global System for Mobile communication/Universal Mobile Telecommunications System (GSM/UMTS). It is emphasized, however, that the aspects described herein may also be applicable to other network types and protocols. The mobile telecommunications environment 100 includes the enterprise 106 in which the small cell RAN 104 is implemented. The small cell RAN 104 includes a plurality of small cell radio nodes 112(1)-112(C). Each small cell radio node 112(1)-112(C) has a radio coverage area (graphically depicted in the drawings as a hexagonal shape) that is commonly termed a "small cell." A small cell may also be referred to as a femtocell, or using terminology defined by 3GPP as a Home Evolved Node B (HeNB). In the description that follows, the term "cell" typically means the combination of a radio node and its radio coverage area unless otherwise indicated.

The size of the enterprise 106 and the number of cells deployed in the small cell RAN 104 may vary. In typical implementations, the enterprise 106 can be from 50,000 to 500,000 square feet and encompass multiple floors, and the small cell RAN 104 may support hundreds to thousands of users using mobile communications platforms such as mobile phones, smartphones, tablet computing devices, and the like shown as the UEs 108(3)-108(N). However, the foregoing is intended to be illustrative and the solutions described herein can be typically expected to be readily scalable either upwards or downwards as the needs of a particular usage scenario demand.

In FIG. 1, the small cell RAN 104 includes one or more services nodes (represented as a single services node 114 in FIG. 1) that manage and control the small cell radio nodes 112(1)-112(C). In alternative implementations, the management and control functionality may be incorporated into a radio node, distributed among nodes, or implemented remotely (i.e., using infrastructure external to the small cell RAN 104). The small cell radio nodes 112(1)-112(C) are coupled to the services node 114 over a direct or local area network (LAN) connection 116, as an example, typically using secure IPsec tunnels. The services node 114 aggregates voice and data traffic from the small cell radio nodes 112(1)-112(C) and provides connectivity over an IPsec tunnel to a security gateway (SeGW) 118 in an Evolved Packet Core (EPC) network 120 of the MNO 110. The EPC network 120 is typically configured to communicate with a public switched telephone network (PSTN) 122 to carry circuit-switched traffic, as well as for communicating with an external packet-switched network such as the Internet 124.

The environment 100 also generally includes an Evolved Node B (eNB) base station, or "macrocell" 102. The radio coverage area of the macrocell 102(1)-102(M) is typically much larger than that of a small cell where the extent of coverage often depends on the base station configuration and surrounding geography. Thus, a given UE 108(3)-108(N) may achieve connectivity to the EPC network 120 through either a macrocell 102 or small cell radio node 112(1)-112(C) in the small cell RAN 104 in the environment 100.

A general principle in environment 100 in FIG. 1 is that a serving RAN (e.g., an eNB in such system) provides a measurement configuration to the UEs 108(1)-108(N) to "point" the receiver of the UEs 108(1)-108(N) to find other systems (e.g., neighboring cells) transmitting at a specified frequency(ies) (e.g., at 1900 MHz, 2500 MHz) according to the measurement configuration that the UE 108(1)-108(N) should measure. The measurement of communications signals of other RANs by the UE 108(1)-108(N) at specified frequencies is performed for a variety of purposes, including inter-frequency mobility and inter-frequency measurements. The UE 108(1)-108(N) can find these communications systems and perform actions, such as cell selection in the idle mode and sending of measurement reports (e.g., Measurement Report Messages (MRMs)) in the active mode. These measurement reports can be used by the serving RAN (e.g., MNO macrocells 102(1)-102(M), shared spectrum cell 103, small cell RAN 104) to, for example, trigger handovers or to gather information about neighboring cells through Automatic Neighbor Relation (ANR) discovery. For example, the MNO macrocells 102(1)-102(M) may use the MRMs for cell reselection to cause a UE 108(1)-108(N) to be serviced by a different cell controlled by the MNO, such as the small cell RAN 104 for example, for optimizing communications. This measurement report information is delivered in user mobile communications device-specific radio resource control signaling messages to serviced UEs 108(1)-108(N) that indicate to the UE 108(1)-108(N) the appropriate measurement configuration parameters. In these measurement configuration parameters, there are specific instructions about what frequencies the serviced UE 108(1)-108(N) should measure. The information measured by the UEs 108(1)-108(N) is then reported back to the serving RAN.

Figure 3A:
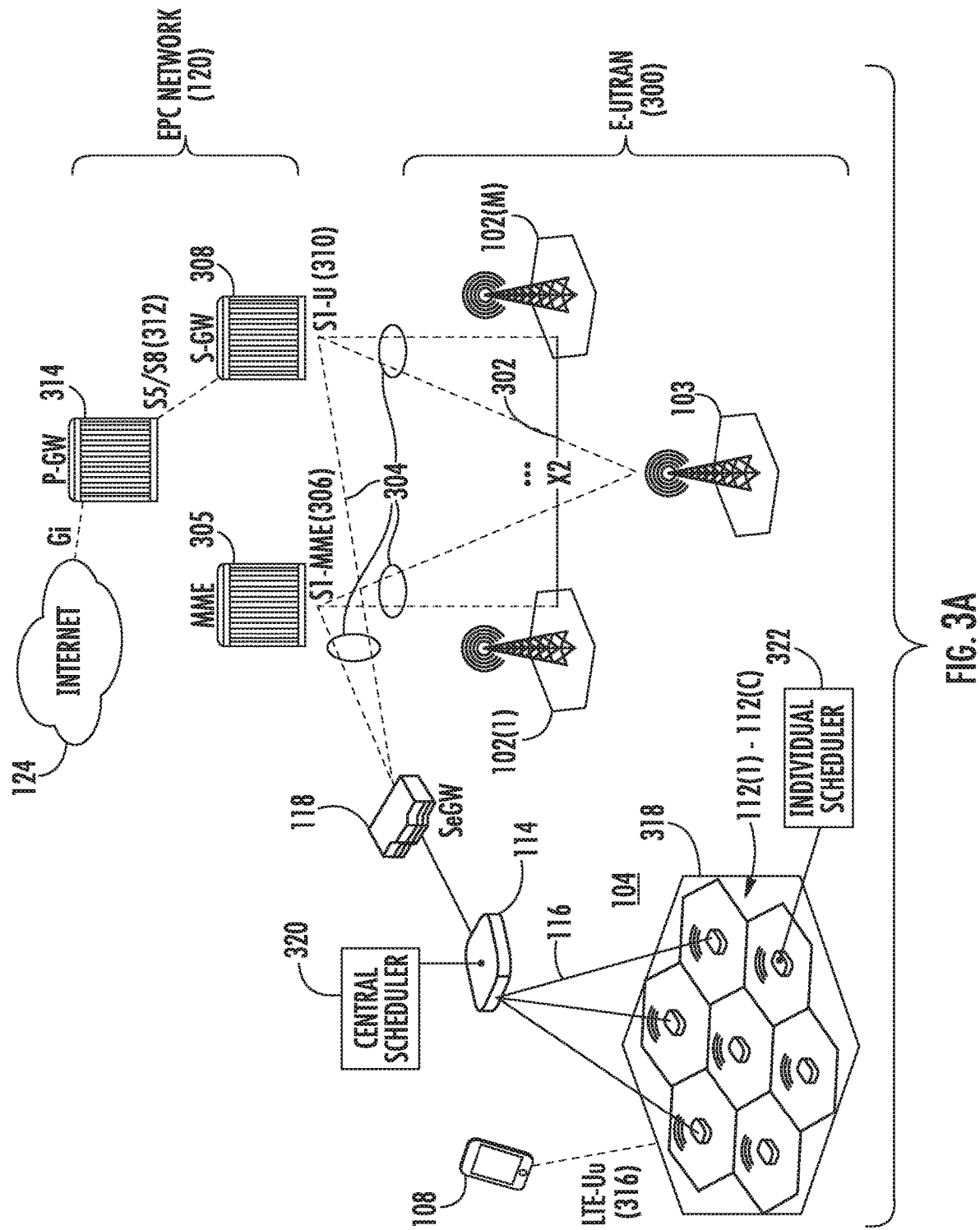
FIG. 3A illustrates exemplary details of an evolved packet core (EPC) and Evolved Universal Mobile Telecommunications System (UMTS) Terrestrial Radio Access Network (E-UTRAN) arranged under Long Term Evolution (LTE) for the mobile telecommunications environment in FIG. 1.

With reference back to FIG. 1, the MNO macrocells 102(1)-102(M), the shared spectrum cell 103, and the small cell RAN 104 may be neighboring radio access systems to each other, meaning that some or all can be in proximity to each other such that a UE 108(3)-108(N) may be able to be in communications range of two or more of the MNO macrocells 102(1)-102(M), the shared spectrum cell 103, and the small cell RAN 104 depending on the location of UE 108(3)-108(N). If a UE 108(1)-108(N) serviced by the small cell RAN 104 as a source RAN moves into the communication coverage area of a neighboring macrocell 102(1)-102(M), the source RAN, detecting a weaker communications signal from the UE 108(1)-108(N), initiates a handover command (i.e., request) to the neighboring macrocell 102(1)-102(M) as a "target RAN." The small cell RAN 104 may be aware of the EARFCN of the MNO macrocells 102(1)-102(M) as part of its configuration or an ANR discovery process discussed above. Similarly, if a UE 108(1)-108(N) serviced by the shared spectrum cell 103 as a source RAN moves into the communication coverage area of a neighboring macrocell 102(1)-102(M), the source RAN initiates a handover command (i.e., request) to the neighboring macrocell 102(1)-102(M) as a "target RAN." The target RAN has a target coverage area overlapping a source coverage area of the source RAN in this example. The shared spectrum cell 103 may be aware of the EARFCN of the MNO macrocells 102(1)-102(M) as part of its configuration or an ANR process discussed above. Along with macrocells 102(1)-102(M), the small cell RAN 104 forms an access network (i.e., an Evolved UMTS Terrestrial Radio Access Network (E-UTRAN)) under 3GPP as represented by reference numeral 300 in FIG. 3A. As shown in FIG. 3A, there is no centralized controller in the E-UTRAN 300, hence an LTE network architecture is commonly said to be "flat." Macrocells 102(1)-102(M) are typically interconnected using an X2 interface 302. The shared spectrum cell 103 may or may not be interconnected to the macrocells 102(1)-102(M) through the X2 interface 302. The macrocells 102(1)-102(M) and shared spectrum cell 103 are also typically connected to the EPC network 120 by means of an S1 interface 304. More particularly, the macrocells 102(1)-102(M) and the shared spectrum cell 103 are connected to a Mobility Management Entity (MME) 305 in the EPC network 120 using an S1-MME interface 306, and to a Serving Gateway (S-GW) 308 using an S1-U interface 310. An S5 interface 312 couples the S-GW 308 to a Packet Data Network Gateway (P-GW) 314 in the EPC network 120 to provide the UE 108 with connectivity to the Internet 124. A UE 108 can connect to the small cell radio nodes 112(1)-112(C) in the small cell RAN 104 over an LTE-Uu interface 316.

The S1-MME interface 306 is also connected to the MME 305 and S-GW 308 in the EPC network 120 using the appropriate S1 interface connections 304. Accordingly, as each of the small cell radio nodes 112(1)-112(C) in the small cell RAN 104 is operatively coupled to the services node 114 over the LAN connection 116, the communications connections from the small cell radio nodes 112(1)-112(C) are aggregated to the EPC network 120. Such aggregation preserves the flat characteristics of the LTE network while reducing the number of S1 interface connections 304 that would otherwise be presented to the EPC network 120. Thus, the small cell RAN 104 essentially appears as a single eNB 318 to the EPC network 120, as shown. The services node 114 in the small cell RAN 104 includes a central scheduler 320. The small cell radio nodes 112(1)-112(C) may also be configured to support individual schedulers 322.

Figure 3B:
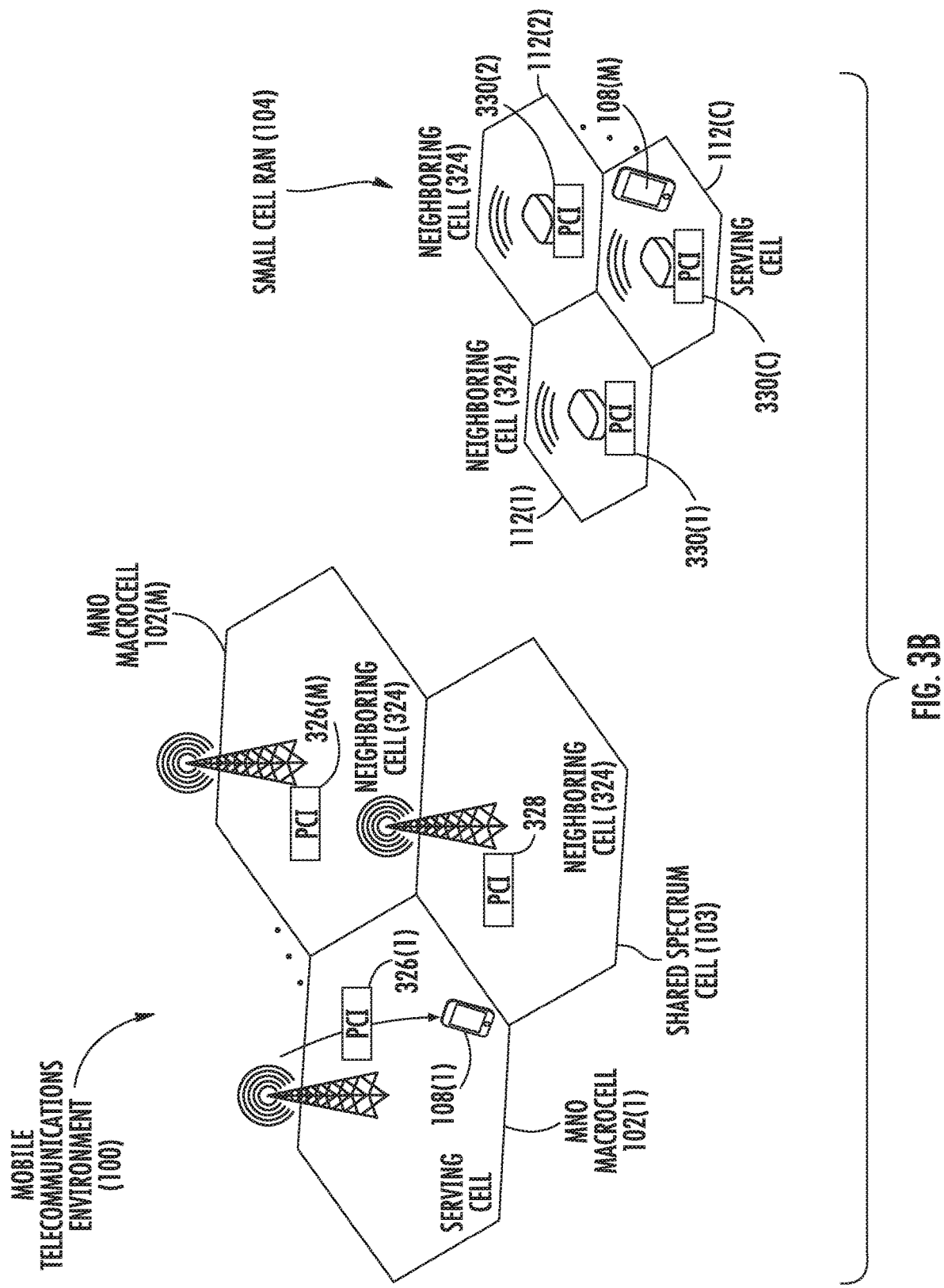
FIG. 3B illustrates small cells and neighboring macro cells within the mobile telecommunications environment in FIG. 1.

A UE 108 connected to the environment 100 will actively or passively monitor a cell in a macrocell 102(1)-102(M) in the E-UTRAN 300 in the communications range of the UE 108 as the UE 108 moves throughout the environment 100. As shown in FIG. 3B, such a cell is termed the "serving cell." For example, if a UE 108 is in communication through an established communications session with a particular small cell radio node 112(1)-112(C) in the small cell RAN 104, the particular small cell radio node 112(1)-112(C) will be the serving cell to the UE 108, and the small cell RAN 104 will be the serving RAN. The UE 108 will continually evaluate the quality of a serving cell as compared with that of a neighboring cell 324 in the small cell RAN 104, MNO macrocells 102, and/or the shared spectrum cell 103, as shown in FIG. 3B. A neighboring cell 324 is a cell among the small cell RAN 104, MNO macrocells 102, and/or the shared spectrum cell 103 that is not in control of the active communications session for a given UE 108, but is located in proximity to a serving cell to a UE 108 such that the UE 108 could be in communications range of both its serving cell and the neighboring cell 324. Each of the small cell radio nodes 112(1)-112(C), the macrocells 102(1)-102(M), and the shared spectrum cell 103 can identify themselves to a UE 108 using a respective unique Physical Cell Identity (PCI) 326(1)-326(M), 328, 330(1)-330(C) (e.g., a public land mobile network (PLMN) identification (ID) (PLMN ID)) that is transmitted over a downlink UE 108. Each of the small cell radio nodes 112(1)-112(C), the MNO macrocells 102(1)-102(M), and the shared spectrum cell 103 can assign a physical channel identity (PCI) that allows the UE 108 to distinguish adjacent cells. As such, the PCIs 326(1)-326(M), 328, 330(1)-330(C) are uniquely assigned among neighboring cells 324, but can be reused across geographically separated cells.

Because the shared spectrum cell 103 and/or small cell RAN 104 in the environment 100 in FIGS. 1 and 3A-3B may use spectrum that is independent of an MNO or is not under full control of the MNO in the same way as traditional licensed spectrum may be, it may be difficult for all surrounding neighboring macrocells 102(1)-102(M) to be constantly aware of all the actual frequencies in which these third party systems were allocated and currently operate on. Even if there is business relationship between the MNO for the macrocells 102(1)-102(M) and the third party operators of the shared spectrum cell 103 and/or small cell RAN 104, the MNO may be completely unaware of the specific frequencies allocated for communications. Even if the third party was made aware of such frequency allocation, this allocation may change dynamically for frequency optimization or other purposes. Thus, if a UE 108(1)-108(N) serviced by an MNO macrocell 102(1)-102(M) moves into the communication coverage area of a neighboring shared spectrum cell 103 and/or small cell RAN 104, the MNO macrocell 102(1)-102(M) as a source RAN may be unaware of the presence of the neighboring shared spectrum cell 103 and/or small cell RAN 104. The MNO macrocell 102(1)-102(M) may be unaware of the frequency bands used by the other neighboring shared spectrum cell 103 and/or small cell RAN 104. Thus, an MNO macrocell 102(1)-102(M) as a serving RAN to a UE 108(1)-108(N) may be unaware of what specific frequencies to point the UE 108(3) to for discovering the shared spectrum cell 103 and/or small cell RAN 104. An MNO macrocell 102(1)-102(M) may become aware of a neighboring shared spectrum cell 103 and/or small cell RAN 104 once a UE 108(1)-108(N) establishes communications with the shared spectrum cell 103 and/or small cell RAN 104 and a handover is initiated by the shared spectrum cell 103 and/or small cell RAN 104 to the MNO macrocell 102(1)-102(M). But it may take a longer time than desired for the MNO macrocells 102(1)-102(M) to become aware of all its neighboring cells, such as the shared spectrum cell 103 and small cell RAN 104, since UE 108(1)-108(N) would have to first originate communications with the neighboring cell and it then move areas for a handover to be initiated by the neighboring cell to an MNO macrocell 102(1)-102(M).

Figure 4:
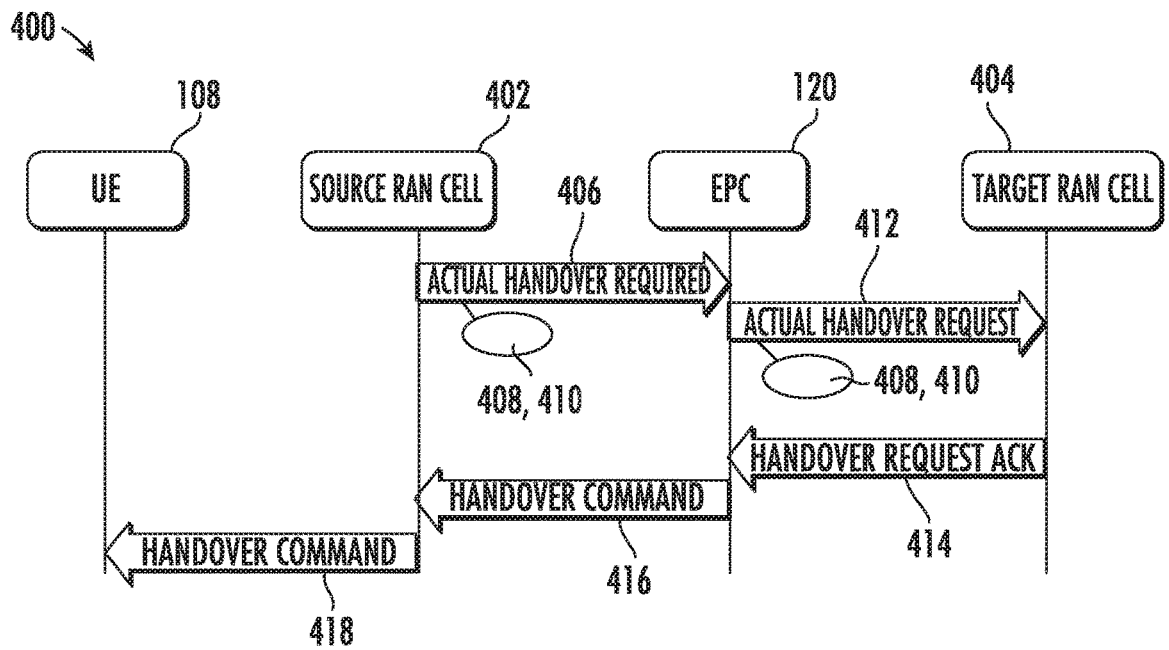
FIG. 4 is a flow diagram illustrating an actual handover process performed between a source RAN cell and a target RAN, including in the E-UTRAN in FIGS. 3A and 3B, to handover a user equipment (UE) served by the source RAN cell to the target RAN.

FIG. 4 is a flow diagram 400 illustrating an actual handover process performed between a source RAN cell and a target RAN cell in a target RAN that may be included in the E-UTRAN 300 in FIGS. 3A and 3B, to describe a handover process of a UE 108 served by a source RAN cell to a target RAN that does not involve a fake handover. In this example, a source RAN cell 402 in a source RAN is shown that has previously established a communication with a UE 108. For example, the source RAN cell 402 can be an MNO macrocell 102(1)-102(M), the shared spectrum cell 103, or the small cell RAN 104 in the E-UTRAN 300 in FIGS. 3A and 3B. A target RAN cell 404 in a target RAN is a neighboring cell to the source RAN cell 402, and can be the MNO macrocell 102(1)-102(M), the shared spectrum cell 103, or the small cell RAN 104 in the E-UTRAN 300 in FIGS. 3A and 3B.

As shown in FIG. 4, when it is desired by the source RAN cell 402 to handover the UE 108 to a target RAN, the source RAN cell 402 initiates a handover of the UE 108 by sending a signaling message 406 that indicates an actual handover is required (i.e., request), thus initiating a handover destined to the target RAN cell 404 in the target RAN. The source RAN cell 402 has either been configured with the identification of the target RAN cell 404 (e.g., its EARFCN) or previously discovered the target RAN cell 404. For example, the target RAN cell 404 may be an MNO macrocell that has a known EARFCN that does not change. The signaling message 406 that indicates an actual handover is required can be communicated in handover signaling according to the 3GPP handover signaling specifications. The source RAN cell 402 sends the signaling message 406 that indicates an actual handover required through the EPC network 120 to reach the target RAN cell 404. The signaling message 406 that indicates an actual handover required 406 includes a UE indicia 408 for identifying the UE 108 communicating with the source RAN cell 402 and to be handed over to the target RAN cell 404. The signaling message 406 that indicates an actual handover required also includes a source RAN cell indicia 410 identifying the source RAN cell 402. For example, the source RAN cell indicia 410 can include the EARFCN of the source RAN cell 402, a public land mobile network (PLMN) identification of the source RAN cell 402, and/or a radio access systems band-identification (band ID) of the source RAN cell 402. This information provided in the source RAN cell indicia 410 can be used to identify and discover the source RAN cell 402 by the target RAN cell 404. The EPC network 120 communicates a signaling message 412 that indicates the actual handover request to the target RAN cell 404 that includes the UE indicia 408 and source RAN cell indicia 410 in response to the signaling message 406 that indicates an actual handover required sent by the source RAN cell 402. In response to receiving the signaling message 412 that indicates the actual handover request, the target RAN cell 404 sends a signaling message 414 that acknowledges the actual handover request to the EPC network 120 to acknowledge receipt of the signaling message 412 that indicates the actual handover request, which causes the EPC network 120 to send a signaling message 416 indicating a handover command to the source RAN cell 402. In response, the source RAN cell 402 sends a signaling message 418 indicating the handover command to the UE 108 to notify the UE 108 that communications have been handed over to the target RAN cell 404. Note that the target RAN cell 404 does not discover the source RAN cell 402 until the UE 108 first establishes communications with the source RAN cell 402 and then moves into the communication area of the target RAN cell 404 sufficient for the source RAN cell 402 to initiate a handover of the UE 108 to the target RAN cell 404.

In exemplary aspects discussed herein, to avoid the requirement that a UE 108 first establish communications with a source RAN cell 402 and then move into the communication area of the target RAN cell 404 sufficient for the source RAN cell 402 to be discovered, the source RAN cell 402 can be configured to initiate its automatic discovery by the target RAN cell 404. The source RAN cell 402 can be configured to initiate a fake UE handover from the source RAN cell 402 to the target RAN cell 404. The fake UE handover is a signaling message that indicates a fake handover command/request without an actual intention of handing over a UE 108(1)-108(N) to the target RAN cell 404. The source RAN cell 402 and target RAN cell 404 can be configured to process the fake handover request initiated by the source RAN cell 402 using standard handover processing, such as according to the 3GPP specification. The handover request will fail, because the handover request is not for any actual UE 108 moving from the coverage area of the source RAN cell 402 to the coverage area of the target RAN cell 404. However, the target RAN cell 404 still becomes aware of the source RAN cell 402 as a result of the handover signaling and can add the source RAN cell 402 (and for example, its EARFCN) to a list of its neighboring cells. In this regard, the source RAN cell 402 does not have to first establish communications with a UE 108 in its cell area that is to be handed over to the target RAN cell 404 for the target RAN cell 404 to discover the source RAN cell 402. The target RAN cell 404 can then, for example, use the discovered source RAN cell 402 for selecting handover targets for a UE 108, to cause the UE 108 to be serviced by a different cell for optimizing communications.

Figure 5:
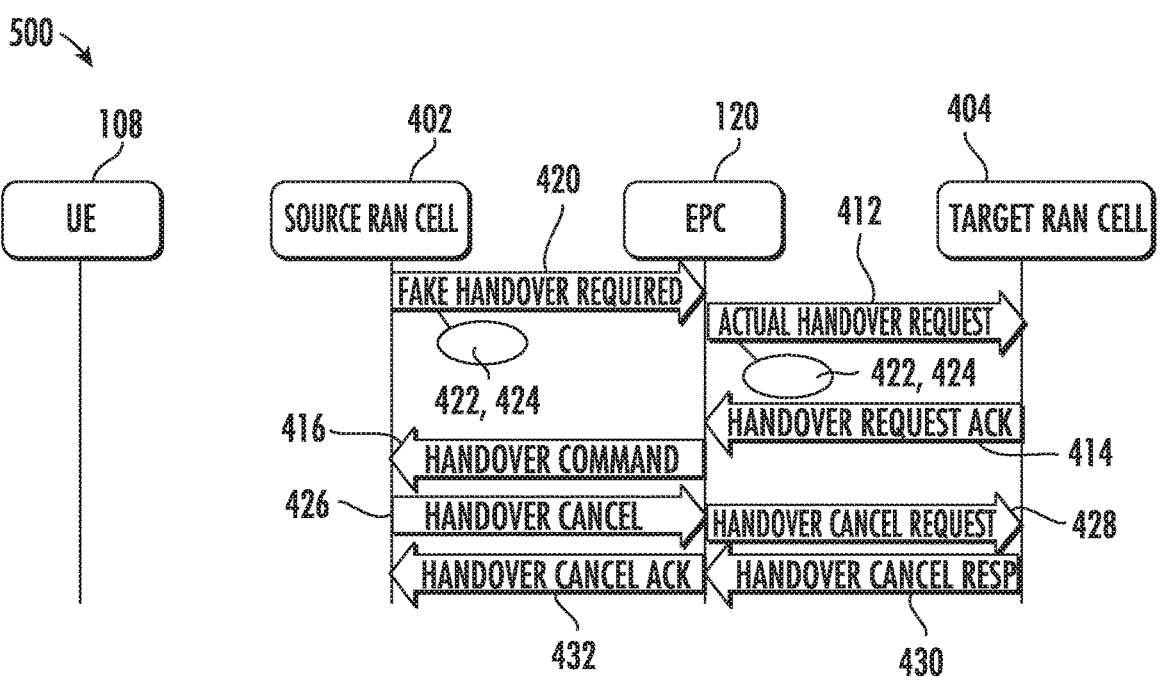
FIG. 5 is a flow diagram illustrating an automatic cell discovery process for a target RAN to discover a source RAN cell, such as in the E-UTRAN in FIGS. 3A and 3B, by the source RAN cell initiating a fake handover request (e.g., in a signaling message) to the target RAN, and the source RAN cell subsequently cancelling the handover request to the target RAN.

In this regard, FIG. 5 is a flow diagram 500 illustrating a fake handover process performed between the source RAN cell 402 and the target RAN cell 404 that may be included in the E-UTRAN 300 in FIGS. 3A and 3B, to describe a fake handover process of a UE 108 served by the source RAN cell 402 to the target RAN cell 404. As shown in FIG. 5, the source RAN cell 402 initiates a fake handover of a UE 108 that is not actually communicating with the source RAN cell 402 by sending a fake handover request. In this example, the source RAN cell 402 sends a signaling message 420 indicating a fake handover required to initiate a fake handover destined to the target RAN cell 404 in the target RAN. A signaling message that indicates a fake handover required is a message in which identifies a UE that is not communicating with the source RAN cell 402. The source RAN cell 402 has either been configured with the identification of the target RAN cell 404 (e.g., its EARFCN) or previously discovered the target RAN cell 404. For example, the target RAN cell 404 may be an MNO macrocell that has a known EARFCN that does not change. The signaling message 420 indicating a fake handover required can be communicated in handover signaling according to the 3GPP handover signaling specifications. The source RAN cell 402 sends the signaling message 420 indicating a fake handover required through the EPC network 120 to reach the target RAN cell 404. The signaling message 420 indicating a fake handover required includes a UE indicia 422 for identifying a UE not communicating with the source RAN cell 402, and a source RAN cell indicia 424 for identifying the source RAN cell 402. For example, the source RAN cell indicia 424 can include the EARFCN of the source RAN cell 402, a PLMN identification of the source RAN cell 402, and/or a radio access systems band identification (band ID) of the source RAN cell 402. This information provided in the source RAN cell indicia 424 can be used to identify and discover the source RAN cell 402 by the target RAN cell 404. The UE indicia 422 may include a UE identification of a UE that is not in actual communication with the source RAN cell 402. In this manner, the handover signaling specifications that specify a UE identification be included in the signaling message 420 that indicates a handover required does not have to be altered.

With continuing reference to FIG. 5, the EPC network 120 communicates the signaling message 412 that indicates an actual handover request to the target RAN cell 404 that includes the UE indicia 422 and the source RAN cell indicia 424 in response to the signaling message 420 that indicates a handover required sent by the source RAN cell 402. The EPC network 120 is unaware that the handover request from the source RAN cell 402 is a fake handover request. In response to receiving the signaling message 412 indicating an actual handover request based on the fake handover initiated from the source RAN cell 402, the target RAN cell 404 sends a signaling message 414 indicating acknowledgement of the actual handover request to the EPC network 120 to acknowledge receipt of the signaling message 412 indicating an actual handover request, which causes the EPC network 120 to send a signaling message 416 indicating a handover command to the source RAN cell 402. In response, the source RAN cell 402 does not send the signaling message 418 indicating the handover command to the UE 108 like in FIG. 4 to notify the UE 108 that communications have been handed over to the target RAN cell 404. This is because the handover request initiated by the source RAN cell 402 is fake. Instead, the source RAN cell 402 sends a signaling message 426 indicating a handover cancellation to cancel the handover request destined for the target RAN cell 404. The EPC network 120 receives the signaling message 426 indicating a handover cancellation destined for the target RAN cell 404, and sends a signaling message 428 indicating a handover cancellation request to the target RAN cell 404 in response. The target RAN cell 404 cancels the original handover request received in the signaling message 412 indicating the actual handover request and does not perform the handover of the UE 108 to the target RAN cell 404, but has already received the source RAN cell indicia 424 to discover the source RAN cell 402. The target RAN cell 404 sends a signaling message 430 indicating a handover cancel response in response to receipt of the signaling message 428, which causes the EPC network 120 to send a signaling message 432 indicating an acknowledgement of the handover cancellation request to the source RAN cell 402 to complete the fake handover request and discovery process of the source RAN cell 402.

Thus, in the handover process in FIG. 5, the target RAN cell 404 is unaware that the handover request is a fake handover request. The source RAN cell 402 sends the signaling message 426 indicating the handover cancellation to cause the target RAN cell 404 to cancel its handover processing. It may be desired to provide for the ability of the target RAN cell 404 to detect the fake handover request from the source RAN cell 402 as fake and only to provide discovery information for the source RAN cell 402 so that the target RAN cell 404 does not initiate a handover process. The target RAN cell 404 can gracefully terminate its handover preparations and processing. However, a mechanism needs to be provided so that the target RAN cell 404 can recognize and distinguish between actual handover requests and fake handover requests from a source RAN cell 402.

Figure 6:
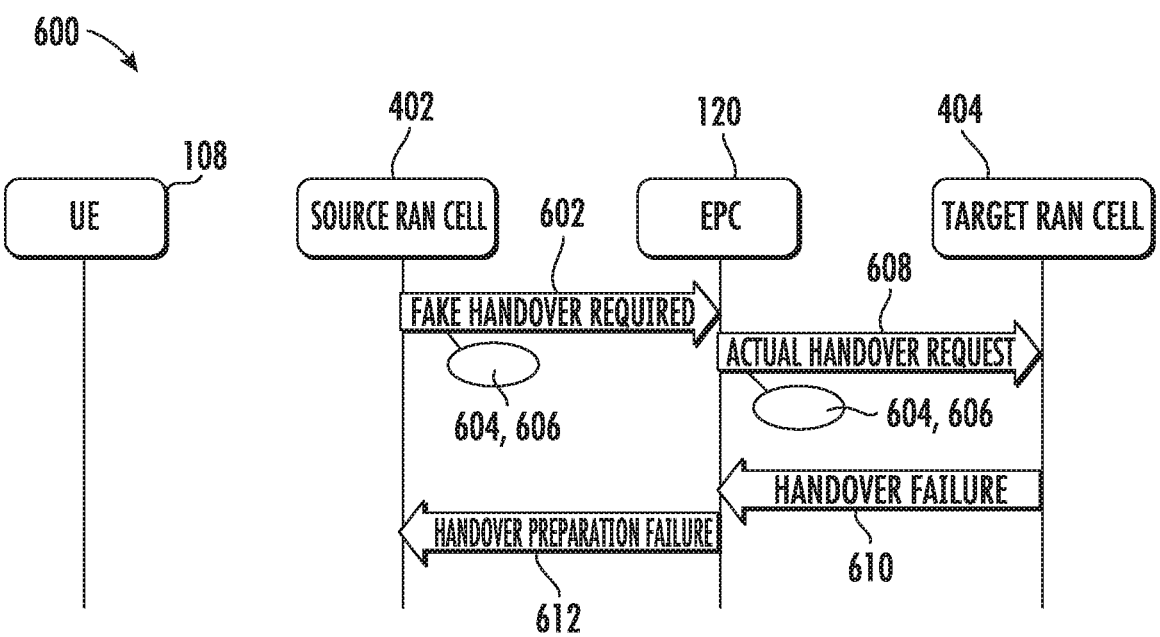
FIG. 6 is a flow diagram illustrating another automatic cell discovery process for a target RAN to discover a source RAN cell, such as in the E-UTRAN in FIGS. 3A and 3B, by the source RAN cell initiating a fake handover request (e.g., in a signaling message) to the target RAN, and the target RAN identifying the fake handover request and subsequently cancelling the handover request to the source RAN cell.

In this regard, FIG. 6 is a flow diagram 600 illustrating a fake handover process performed between the source RAN cell 402 and the target RAN cell 404 that may be included in the E-UTRAN 300 in FIGS. 3A and 3B, to describe a fake handover process of a UE 108 served by the source RAN cell 402 to the target RAN cell 404. The target RAN cell 404 is configured to identify the fake handover request and subsequently cancel the handover request to the source RAN cell 402 without the source RAN cell 402 having to cancel the handover request. As shown in FIG. 6, the source RAN cell 402 initiates a fake handover of a UE 108 that is not actually communicating with the source RAN cell 402 by sending a fake handover request. In this example, the source RAN cell 402 sends a signaling message 602 indicating a fake handover required destined to the target RAN cell 404 in the target RAN. The source RAN cell 402 has either been configured with the identification of the target RAN cell 404 (e.g., its EARFCN) or previously discovered the target RAN cell 404. The signaling message 602 indicating a fake handover required can be communicated in handover signaling according to the 3GPP handover signaling specifications. The source RAN cell 402 sends the signaling message 602 indicating a fake handover required through the EPC network 120 to reach the target RAN cell 404. The signaling message 602 indicating a fake handover required includes a UE indicia 604 for identifying a UE and a source RAN cell indicia 606 for identifying the source RAN cell 402. For example, the source RAN cell indicia 606 can include the EARFCN of the source RAN cell 402, a PLMN identification of the source RAN cell 402, and/or a radio access systems band-identification (band ID) of the source RAN cell 402. This information provided in the source RAN cell indicia 606 can be used to identify and discover the source RAN cell 402 by the target RAN cell 404. The UE indicia 604 may include a pseudo UE identification that a UE identification of a fake or non-existent UE that is not in actual communication with the source RAN cell 402, and that will recognized by the target RAN cell 404 as a fake handover request. In this manner, the target RAN cell 404 can determine that the fake handover request from the source RAN cell 402 is fake. This can be accomplished, by example, by updating the handover signaling, such as in 3GPP, to provide for a pseudo UE ID or other distinguishing indicator to indicate a fake handover request, or by agreement between operators of the source RAN cell 402 and target RAN cell 404. If by agreement, an available field in the handover signaling can be agreed upon to provide an indicator of a fake handover request.

With continuing reference to FIG. 6, the EPC network 120 communicates a signaling message 608 indicating an actual handover request to the target RAN cell 404 that includes the UE indicia 604 and the source RAN cell indicia 606 in response to the signaling message 602 indicating a fake handover required sent by the source RAN cell 402. The EPC network 120 is unaware that the handover request from the source RAN cell 402 is a fake handover request. In response to receiving the signaling message 608 indicating an actual handover request, the target RAN cell 404 can determine that the signaling message 608 indicating an actual handover request is for a fake handover as opposed to an actual handover. The target RAN cell 404 performs the discovery of the source RAN cell 402 based on the source RAN cell indicia 606 included in the signaling message 608 indicating an actual handover request. The target RAN cell 404 can then go ahead, knowing the handover request is fake, and send a signaling message 610 indicating a handover failure destined for the source RAN cell 402. The target RAN cell 404 does not perform handover processing to actually handover a UE 108. The EPC network 120 receives the signaling message 610 indicating a handover failure and communicates a signaling message 612 indicating a handover preparation failure to the source RAN cell 402 in response to receiving the signaling message 610 indicating a handover failure. The source RAN cell 402 knows in response to receiving the signaling message 612 indicating a handover preparation failure that the target RAN cell 404 received and canceled the fake handover request message while discovering the source RAN cell 402.

Figure 7:
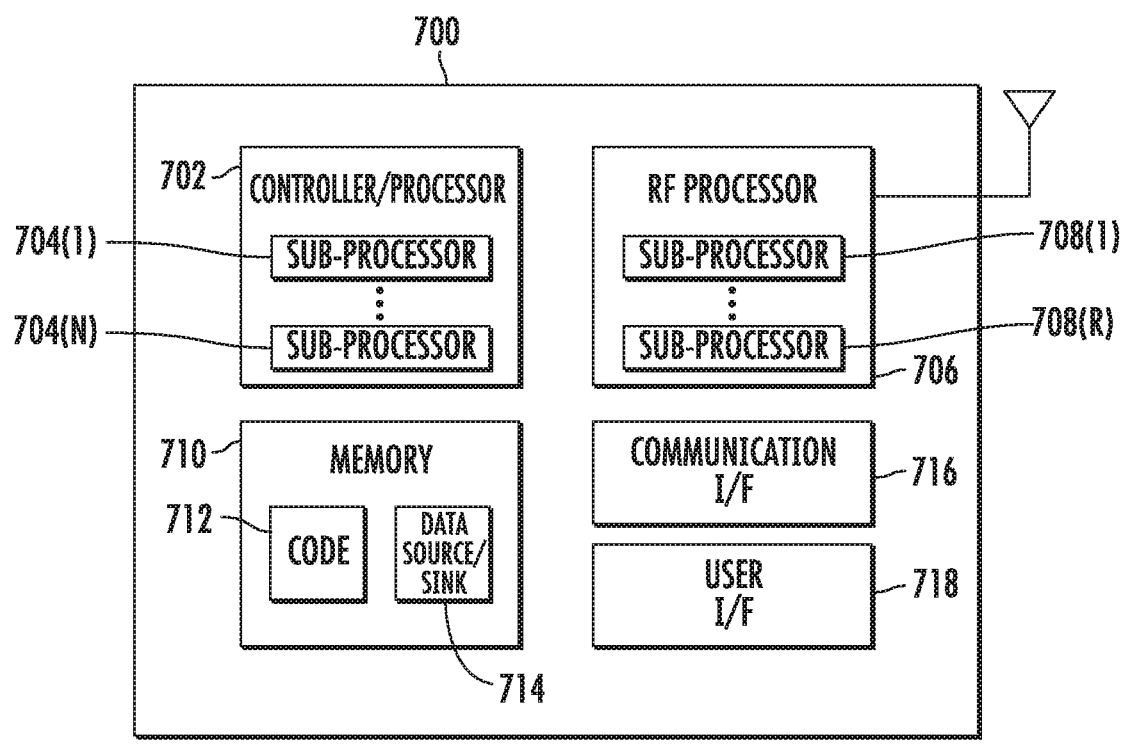
FIG. 7 is a schematic diagram of an exemplary computer system that can be implemented for a radio cell of a RAN or a user mobile communications device that may be configured to facilitate an automatic cell discovery process for a target RAN to discover a source RAN cell by the source RAN cell initiating a fake handover request to the target RAN, wherein the computer system is adapted to execute instructions from an exemplary computer readable link.

FIG. 7 shows a simplified functional block diagram 700 of an illustrative computer system for a radio cell as a serving cell in a serving RAN, including the macrocell 102(1)-102(M), shared spectrum cell 103, and/or small cell RAN 104 with small cells, and/or a UE 108(1)-108(N) in FIG. 1 that can be configured to initiate an automatic discovery of its cell by a neighboring, target RAN, by initiating a fake UE handover from the source RAN cell to the target RAN. A controller/processor 702 typically handles high level processing. The controller/processor 702 may include one or more sub-processors 704(1)-704(N) or cores that are configured to handle specific tasks or functions. An RF processor 706 implements various signal processing functions for the downlink including the lower level L1 processing. The RF processor 706 may include one or more sub-processors 708(1)-708(R) or cores that are configured to handle specific tasks or functions. A memory 710 is a computer-readable medium that stores computer-readable code 712 that is executable by one or more processors including the controller/processor 702 and/or the RF processor 706. The memory 710 may also include various data sources and data sinks (collectively represented by element 714) that may provide additional functionalities.

The code 712 in typical deployments is arranged to be executed by the one or more processors to facilitate the discovery of a neighboring radio access system or cells reporting to a serving RAN. The code 712 additionally enables implementation of both the dedicated PCI identity and common PCI identity using the same hardware infrastructure in a given dual identity cell when executed. The hardware infrastructure may also include various interfaces (I/Fs) including a communication I/F 716 which may be used, for example, to implement a link to the services node 114 (FIG. 1), LAN, or to an external processor, control, or data source. In some cases, a user I/F 718 may be utilized to provide various indications such as power status or to enable some local control of features or settings. It is noted that the block diagram 700 may also be substantially applicable to a services node 114, MNO macrocell 102, shared spectrum cell 103, small cell RAN 104 and/or the UEs 108(1)-108(N). More particularly, the RF processor 706 may be eliminated in some applications and any functionality that it provides that is needed to implement the services node 114 may be provided by the controller/processor 702.

While the computer-readable medium is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of a target radio access network (RAN) discovering a source RAN cell, comprising:
    receiving a first signaling message for handing over a user equipment (UE) to the target RAN comprising a UE indicia identifying a UE not communicating with the source RAN cell and a source RAN cell indicia;
    discovering the source RAN cell based on the source RAN cell indicia;
    determining if the first signaling message is an actual handover initiation signaling message for a UE communicating with the source RAN cell based on at least one of the source RAN cell indicia and the UE indicia; and in response to determining that the first signaling message is not an actual handover initiation signaling message, sending a second signaling message destined for the source RAN cell indicating that target RAN is not proceeding with the initiated handover.

2. The method of claim 1, wherein the first signaling message comprises Third Generation Partnership Project (3GPP) handover signaling.

3. The method of claim 1, wherein discovering the source RAN cell based on the source RAN cell indicia comprises determining an Evolved Universal Terrestrial Radio Access (E-UTRA) Absolute Radio Frequency Channel Number (EARFCN) for the source RAN cell based on the source RAN cell indicia.

4. The method of claim 1, wherein the source RAN cell indicia comprises a public land mobile network (PLMN).

5. The method of claim 1, wherein the source RAN cell indicia comprises a radio access systems band-identification (band ID).

6. The method of claim 1, further comprising sending a second signaling message destined for the source RAN cell in response to receiving the first signaling message.

7. The method of claim 1, further comprising:
receiving a third signaling message from the source RAN cell; and
canceling the initiated handover based on the first signaling message in response to receiving the third signaling message.

8. The method of claim 1, further comprising, in response to determining if the first signaling message is an actual handover initiation signaling message, sending a third signaling message destined for the source RAN cell to initiate handover of a UE from the source RAN cell to the target RAN.

9. The method of claim 1, wherein determining if the first signaling message is an actual handover initiation signaling message comprises determining if the first signaling message is an actual handover initiation signaling message for the UE communicating with the source RAN cell based on the source RAN cell indicia comprising pseudo UE identification identifying a UE identification for a UE that cannot communicate with the source RAN cell.

\* \* \* \* \*

UNITED STATES PATENT AND TRADEMARK OFFICE
CERTIFICATE OF CORRECTION

PATENT NO. : 11,089,524 B2
APPLICATION NO. : 16/264110
DATED : August 10, 2021
INVENTOR(S) : Kalle Ahmavaara Page 1 of 1

It is certified that error appears in the above-identified patent and that said Letters Patent is hereby corrected as shown below:

In the Specification

On Column 17, Line 39, delete "distributed antenna"

Signed and Sealed this
Twenty-seventh Day of September, 2022

Katherine Kelly Vidal
*Director of the United States Patent and Trademark Office*